US012638746B2

(12) United States Patent
Gong et al.

(10) Patent No.: US 12,638,746 B2
(45) Date of Patent: May 26, 2026

(54) ZOOM LENS

(71) Applicant: ZHONGSHAN UNION OPTECH RESEARCH INSTITUTE CO., LTD., Zhongshan (CN)

(72) Inventors: Junqiang Gong, Zhongshan (CN); Hui Liu, Zhongshan (CN); Shengping Qiu, Zhongshan (CN); Hao Wang, Zhongshan (CN); Kun Li, Zhongshan (CN); Yang Wu, Zhongshan (CN); Xudong Zheng, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 330 days.

(21) Appl. No.: 18/433,737

(22) Filed: Feb. 6, 2024

(65) Prior Publication Data
US 2025/0251643 A1      Aug. 7, 2025

(51) Int. Cl.
*G03B 3/12* (2021.01)
*G02B 7/10* (2021.01)
*H02K 41/035* (2006.01)
(52) U.S. Cl.
CPC ................. *G03B 3/12* (2013.01); *G02B 7/10* (2013.01); *H02K 41/0356* (2013.01)

(58) Field of Classification Search
CPC ......... G03B 3/12; G02B 7/10; H02K 41/0356
USPC .......................................................... 359/676
See application file for complete search history.

(56) References Cited

U.S. PATENT DOCUMENTS 6,046,864 A * 4/2000 Onda ....................... G02B 7/10
                                                      359/830

* cited by examiner

*Primary Examiner* — William Choi
(74) *Attorney, Agent, or Firm* — Westbridge IP LLC

(57) ABSTRACT

Disclosed is a zoom lens, including: a lens barrel, a lens group, a linear magnetic driving mechanism, and a locking structure; the lens barrel extends in a front-to-rear direction; the lens group includes at least one mobile group movably provided in the lens barrel along the front-to-rear direction; the linear magnetic driving mechanism is provided in the lens barrel and drivenly connected to the mobile group; and the locking structure includes a locking member and a locking mechanism, the locking member includes a plurality of locking grooves, and the locking mechanism includes: a latch, an electromagnetic driving mechanism and a reset member; the latch is movably provided in a direction approaching and away from each locking groove, the latch has a locking position inserted into the locking groove and an unlocking position separated from the locking groove during a moving stroke.

12 Claims, 11 Drawing Sheets

40 front-to-rear
direction

ZOOM LENS

TECHNICAL FIELD

The present application relates to the technical field of zoom lens structure, and in particular to a zoom lens.

BACKGROUND

Traditional zoom lenses generally use traditional screw transmitting structures. The screw structure plays a transmitting role when working and plays a locking role when not working. However, the focusing process of the screw structure from the wide-angle end to the telephoto end takes a few seconds. The longer the focal length of the lens, the longer it takes to focus. If the screw transmitting structure is canceled and other drive structures are used, when it needs to lock after the zoom group or focus group completes zooming or focusing, a locking mechanism is generally integrated into the optical structure. When the lens locking structure needs to be locked, the locking mechanism applies current through a voice coil motor (VCM) to generate the electromagnetic force, so that the position of the locking structure is fixed by the locking mechanism and is prevented from moving. However, when the locking mechanism is suddenly powered off, the locking mechanism will fail to lock, causing the risk of damage to the lens.

SUMMARY

The main purpose of the present application is to propose a zoom lens, aiming to solve the problem that in a lens structure with fast focusing, the locking structure will fail when the power is suddenly cut off, causing the risk of damage to the lens.

In order to achieve the above purpose, the present application proposes a zoom lens, including: a lens barrel, a lens group, a linear magnetic driving mechanism, and a locking structure. The lens barrel extends in a front-to-rear direction; the lens group includes at least one mobile group movably provided in the lens barrel along the front-to-rear direction; the linear magnetic driving mechanism is provided in the lens barrel and drivenly connected to the mobile group; and the locking structure includes a locking member provided on one of the lens barrel and the mobile group and a locking mechanism provided on the other one of the lens barrel and the mobile group, the locking member includes a plurality of locking grooves provided at intervals in the front-to-rear direction, and the locking mechanism includes: a latch, an electromagnetic driving mechanism and a reset member. The latch is movably provided in a direction approaching and away from each locking groove, the latch has a locking position inserted into the locking groove and an unlocking position separated from the locking groove during a moving stroke; the electromagnetic driving mechanism is configured to drive the latch to move and drive the latch to switch from the locking position to the unlocking position when powered; and the reset member is configured to switch the latch from the unlocking position to the locking position.

In an embodiment, the electromagnetic driving mechanism includes a magnetic circuit assembly fixed on the mobile group and an inducting coil fixedly connected to the latch; and the magnetic circuit assembly is formed with a magnetic field, and at least part of the inducting coil is in the magnetic field; in response to that the inducting coil is energized to interact with the magnetic circuit assembly, the inducting coil is configured to move relative to the magnetic circuit assembly along a groove depth direction of the locking groove, so that the latch is driven to move.

In an embodiment, the inducting coil is provided on a periphery of the latch to include a first wire group and a second wire group respectively provided on both sides of the latch; and the magnetic circuit assembly includes a plurality of magnets extending along the groove depth direction of the locking groove, and the plurality of magnets include two first magnets provided at intervals and two second magnets provided at intervals; magnetic poles of the two first magnets close to each other are different, and the first wire group is provided in a first magnetic gap formed between the two first magnets; magnetic poles of the two second magnets close to each other are different, and the second wire group is provided in a second magnetic gap formed between the two second magnets.

In an embodiment, the locking member is fixed on an inner wall of the lens barrel, the locking mechanism is fixed on the mobile group, and the locking mechanism further includes: an installing shell and an installing bracket; the installing shell is fixedly connected to the mobile group, the magnetic circuit assembly is provided on the installing shell, and an opening is provided at one end of the installing shell towards the locking member; and the installing bracket is sleeved in the installing shell, the latch is installed on the installing bracket, the inducting coil is installed on the installing bracket; the latch can be driven to move by the installing bracket, and at least part of the latch is exposed outside the opening in the locking position.

In an embodiment, the reset member includes a compressing spring provided on one side of the latch away from the locking member, and the compressing spring is provided between the latch and an inner wall of the installing shell.

In an embodiment, the installing shell is configured as a magnetically conductive installing shell magnetically connected to the magnetic circuit assembly.

In an embodiment, the locking mechanism further includes a limiting end cap covering the opening, and the limiting end cap is configured to limit the latch in the locking position in response to that the latch is reset and moving towards the locking position.

In an embodiment, a limiting convex portion is formed in the installing shell and provided on one side of the installing bracket away from the opening, and the limiting convex portion is configured to limit the latch in the unlocking position in response to that the latch is driven by the installing bracket to move towards the unlocking position.

In an embodiment, the linear magnetic driving mechanism includes a linear motor, and the linear motor includes: a stator structure and a mover structure; the stator structure is connected to the lens barrel and including a linear guiding rail extending in the front-to-rear direction; and the mover structure includes at least one mover slidably provided on the linear guiding rail along the front-to-rear direction, and the mover is fixedly connected to the mobile group.

In an embodiment, the zoom lens further includes: a power supply and an electronic control apparatus; the power supply is configured to supply power to the electromagnetic driving mechanism; and the electronic control apparatus is electrically connected to the power supply and the electromagnetic driving mechanism and is configured to control a current of the power supply.

In an embodiment, the power supply is further configured to supply power to the linear magnetic driving mechanism; and the electronic control apparatus is electrically connected to the linear magnetic driving mechanism, and is configured to control the power supply to synchronously supply power and disconnect power to the linear magnetic driving mechanism and the electromagnetic driving mechanism.

In an embodiment, the zoom lens further includes: a regulating mechanism and a photosensitive element; the regulating mechanism includes: a fixed seat, a first adjusting member, a first slider, a second adjusting member and a second slider; the fixed seat is fixed in the lens barrel and provided with a first sliding groove extending in a left-to-right direction; the first adjusting member adjustably is provided on the fixed seat in the left-to-right direction; the first slider slidably is cooperated with the first sliding groove and includes a first abutting portion for abutting against the first adjusting member during moving, so that a position of the first slider in the left-to-right direction is adjusted; the second adjusting member is adjustably provided on the first slider in an up-to-down direction; and the second slider is provided with a second sliding groove extending in the up-to-down direction, the second slider is slidably cooperated with the first slider through the second sliding groove, and the second slider includes a second abutting portion for abutting against the second adjusting member during the moving stroke, so that a position of the second slider in the up-to-down direction is adjusted; the photosensitive element is fixed on the second slider.

In the technical solution provided by the present application, the mobile group is driven to be movable in the front-to-rear direction by the linear magnetic driving mechanism, so that the mobile group can zoom or focus during the movement. The mobile group is driven by the linear magnetic driving mechanism. Compared with the existing motor-driven ball screw structure, the middle screw transmission structure is eliminated; eliminating various positioning errors caused by the intermediate transmission link helps to improve the positioning accuracy of the mobile group. In addition, since the movable parts in the linear magnetic driving mechanism are supported by the magnetic force, there is always a certain gap without contact between the fixed parts and the movable parts in the linear magnetic driving mechanism. On the one hand, it can eliminate the frictional resistance between the fixed parts and the movable parts, which helps to improve the reaction speed and moving speed of the mobile group, and achieves fast focusing or zooming. In order to prevent the normal activities of the mobile group from being affected, when the electromagnetic driving mechanism gains power, the latch can be driven to the unlocking position. When the electromagnetic driving mechanism loses power, the reset member is configured to switch the latch from the unlocking position to the locking position. Since the electromagnetic driving mechanism requires the electricity to generate the magnetic drive, if the electromagnetic driving mechanism suddenly loses power, the latch will be automatically switched to the locking position by the reset member, making the mobile group unable to move. This is to solve the problem that in the lens structure with fast focusing, the locking structure will fail to lock when the power is suddenly cut off, causing the risk of damage to the lens.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
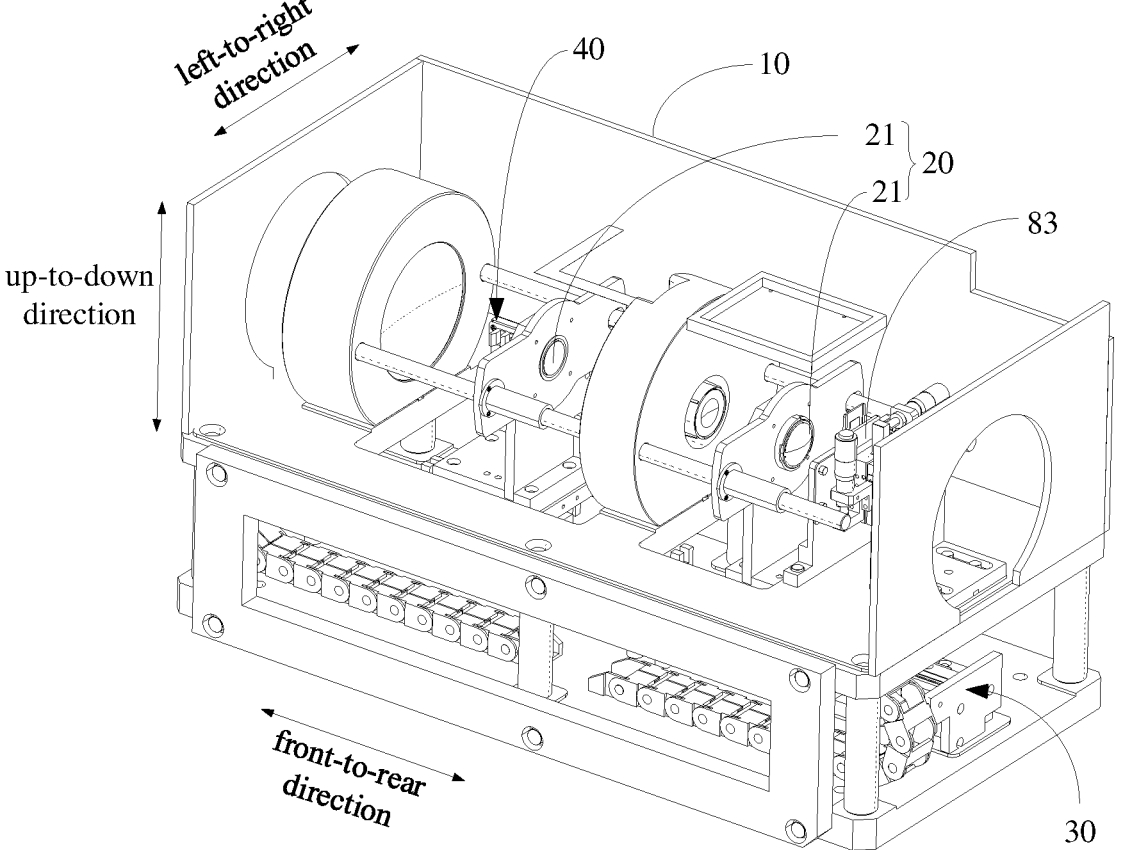
FIG. 1 is a schematic three-dimensional view of a partial structure of a zoom lens in the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

Traditional zoom lenses generally use traditional screw transmitting structures. The screw structure plays a transmitting role when working and plays a locking role when not working. However, the focusing process of the screw structure from the wide-angle end to the telephoto end takes a few seconds. The longer the focal length of the lens, the longer it takes to focus. If the screw transmitting structure is canceled and other drive structures are used, when it needs to lock after the zoom group or focus group completes zooming or focusing, a locking mechanism is generally integrated into the optical structure. When the lens locking structure needs to be locked, the locking mechanism applies current through a voice coil motor (VCM) to generate the electromagnetic force, so that the position of the locking structure is fixed by the locking mechanism and is prevented from moving. However, when the locking mechanism is suddenly powered off, the locking mechanism will fail to lock, causing the risk of damage to the lens.

Figure 2:
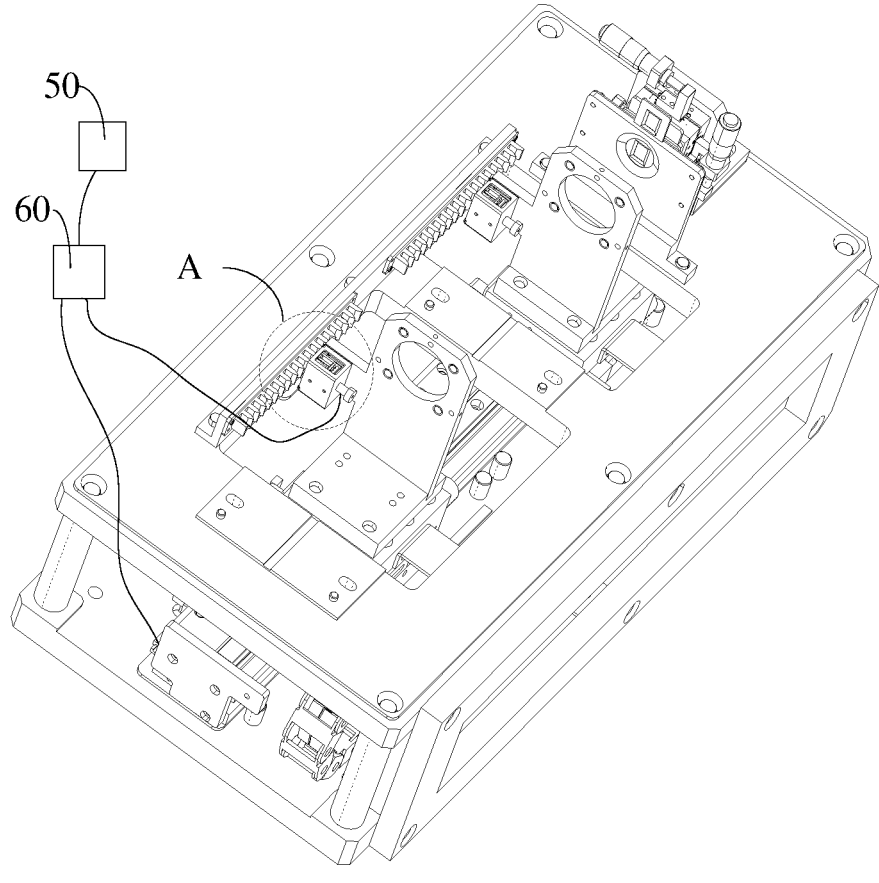
FIG. 2 is a three-dimensional schematic view of the partial structure of the zoom lens in FIG. 1 from another perspective.
Figure 3:
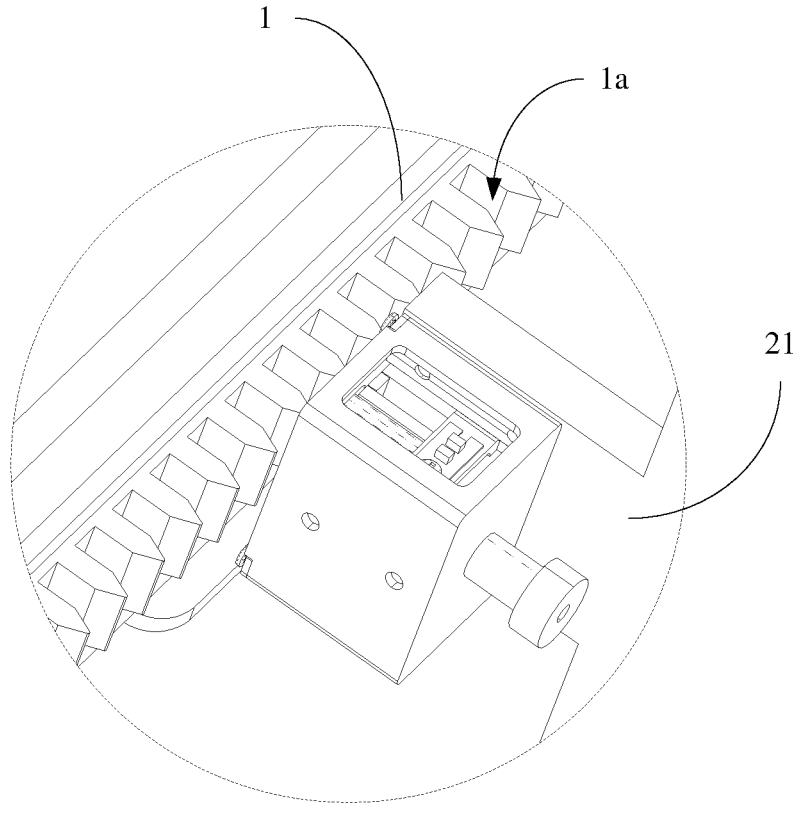
FIG. 3 is an enlarged view at A in FIG. 2.
Figure 4:
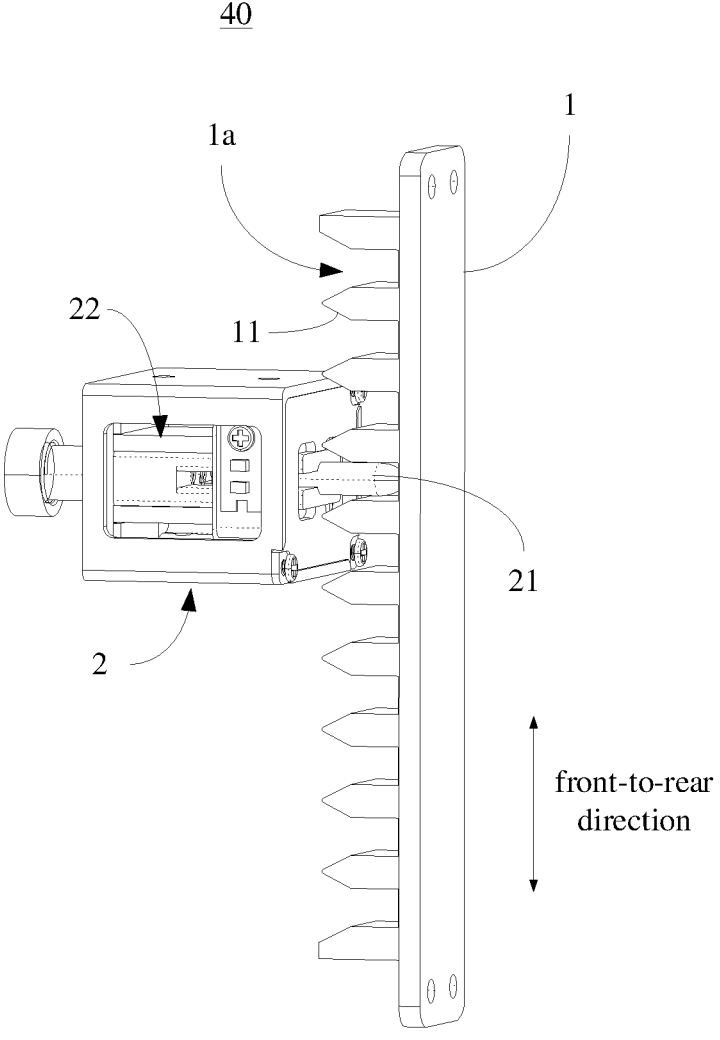
FIG. 4 is a three-dimensional schematic view of a locking structure in FIG. 1.
Figure 5:
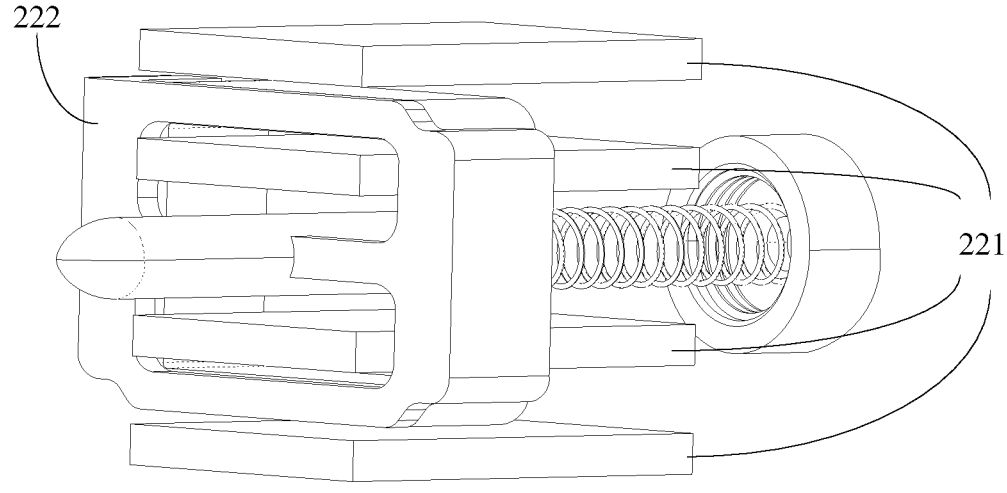
FIG. 5 is a three-dimensional schematic view of a partial structure of the locking structure in FIG. 1.
Figure 6:
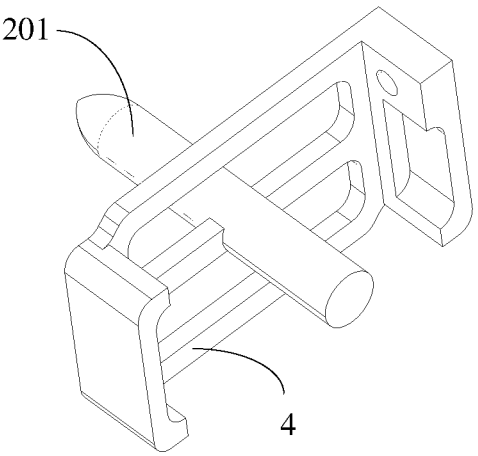
FIG. 6 is a three-dimensional view of a latch and an installing bracket in FIG. 4.
Figure 7:
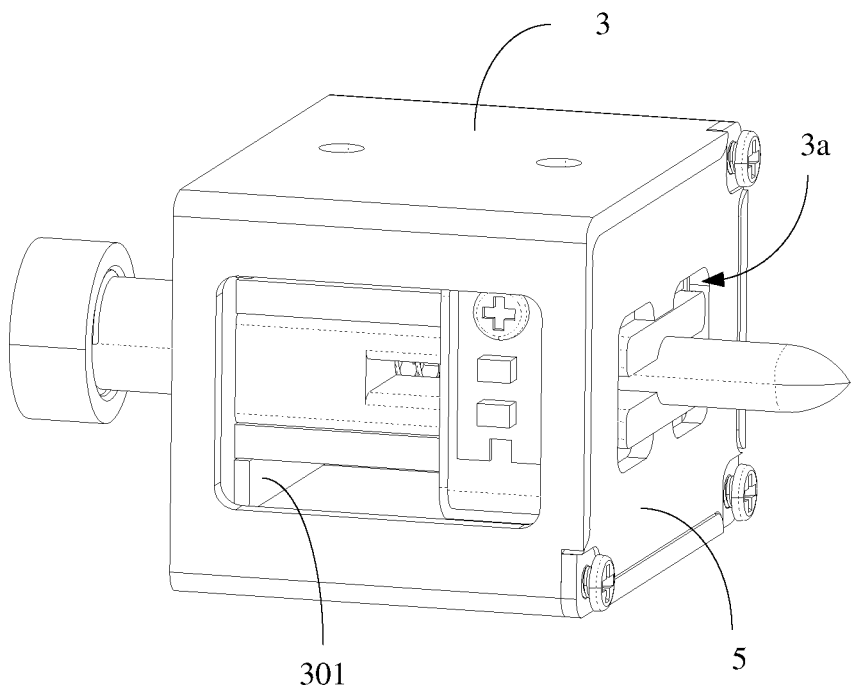
FIG. 7 is a three-dimensional schematic view of the locking mechanism in FIG. 4.
Figure 8:
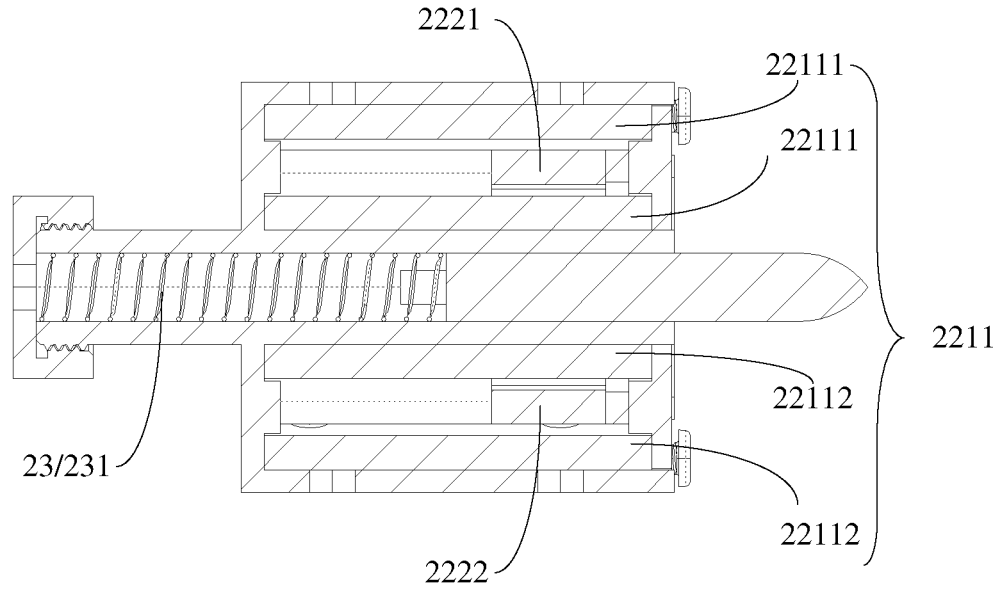
FIG. 8 is a schematic cross-sectional view of the locking mechanism in FIG. 7.
Figure 9:
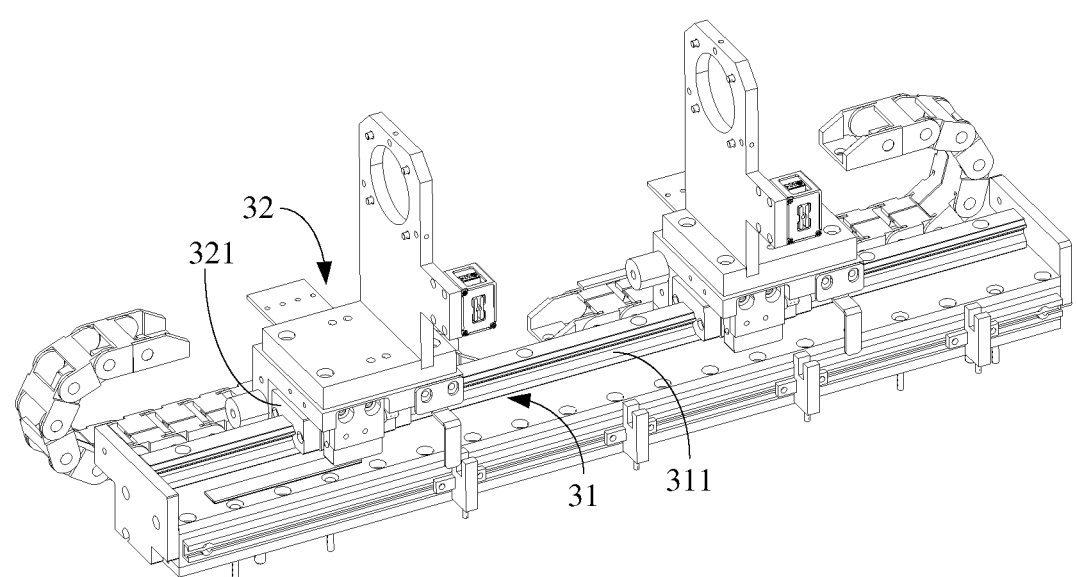
FIG. 9 is a three-dimensional schematic view of a linear magnetic driving mechanism in FIG. 1.
Figure 10:
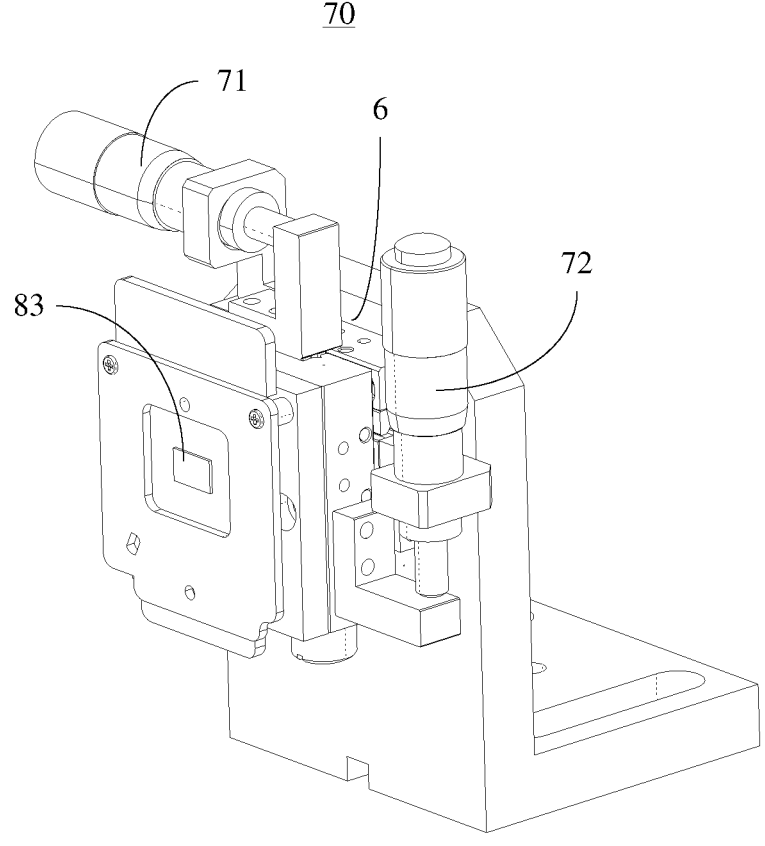
FIG. 10 is a three-dimensional schematic view of a regulating mechanism a photosensitive element in FIG. 1.
Figure 11:
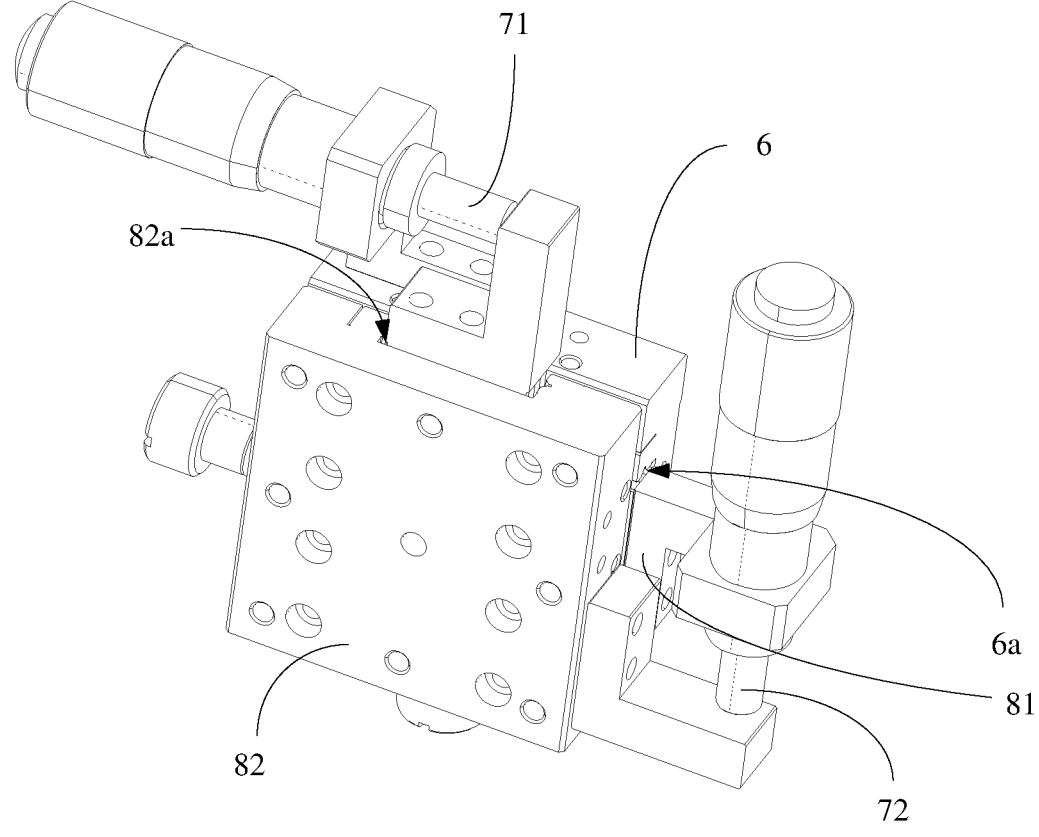
FIG. 11 is a three-dimensional schematic view of the regulating mechanism in FIG. 10.

In order to solve the above problems, the present application provides a zoom lens. FIG. 1 is a schematic three-dimensional view of a partial structure of a zoom lens according to an embodiment of the present application. FIG. 2 is a three-dimensional schematic view of the partial structure of the zoom lens in FIG. 1 from another perspective. FIG. 3 is an enlarged view at A in FIG. 2. FIG. 4 is a three-dimensional schematic view of a locking structure in FIG. 1. FIG. 5 is a three-dimensional schematic view of a partial structure of a locking structure in FIG. 1. FIG. 6 is a three-dimensional view of a latch and an installing bracket in FIG. 4. FIG. 7 is a three-dimensional schematic view of the locking mechanism in FIG. 4. FIG. 8 is a schematic cross-sectional view of the locking mechanism in FIG. 7. FIG. 9 is a three-dimensional schematic view of a linear magnetic driving mechanism in FIG. 1. FIG. 10 is a three-dimensional schematic view of a regulating mechanism a photosensitive element in FIG. 1. FIG. 11 is a three-dimensional schematic view of the regulating mechanism in FIG. 10.

Please refer to FIG. 1 to FIG. 4, the zoom lens 100 includes a lens barrel 10, a lens group 20, a linear magnetic driving mechanism 30 and a locking structure 40. The lens barrel 10 extends in a front-to-rear direction; the lens group 20 includes at least one mobile group 21 movably installed in the lens barrel 10 in the front-to-rear direction; the linear magnetic driving mechanism 30 is provided in the lens barrel 10 and is drivingly connected to the mobile group 21; the locking structure 40 includes a locking member 1 provided on one of the lens barrel 10 and the mobile group 21, and a locking mechanism 2 provided on the other one of the lens barrel 10 and the mobile group 21. The locking member 1 includes a plurality of locking grooves 1a spaced apart in the front-to-rear direction, and the locking mechanism 2 includes a latch 201, an electromagnetic driving mechanism 22 and a reset member 23. The latch 201 is movably provided in the direction close to and away from each of the locking grooves 1a. The latch 201 has a locking position inserting into the locking groove 1a and a unlocking position separating from the locking groove 1a during the moving process. The electromagnetic driving mechanism 22 is configured to drive the movement of the latch 201, and the electromagnetic driving mechanism 22 is configured to drive the latch 201 to switch from the locking position to the unlocking position when gaining power. The reset member 23 is configured to switch the latch 201 from the unlocking position to the locking position.

It should be noted that the front-to-rear directions, up-to-down directions, and left-to-right directions defined in the present application are not absolute directions. The front-to-rear directions refer to the direction consistent with the extending direction of the optical axis of the zoom lens 100. The up-to-down directions and the left-to-right directions are perpendicular and orthogonal to each other, and are orthogonal to the front-to-rear direction.

It should also be noted that the descriptions "in the front-to-rear direction", "in the left-to-right direction" and "in the up-and-down direction" involved in the present application are understood to mean the general direction of extension. For example, "in the front-to-rear direction" does not necessarily mean being overlapped in the front-to-rear direction, and can be a direction with a certain angle between the front-to-rear directions.

In the technical solution provided by the present application, the mobile group 21 is driven to be movable in the front-to-rear directions by the linear magnetic driving mechanism 30, so that the mobile group 21 can zoom or focus during the movement. The mobile group 21 is driven by the linear magnetic driving mechanism 30. Compared with the existing motor-driven ball screw structure, the middle screw transmission structure is eliminated; eliminating various positioning errors caused by the intermediate transmission link helps to improve the positioning accuracy of the mobile group 21. In addition, since the movable parts in the linear magnetic driving mechanism 30 are supported by the magnetic force, there is always a certain gap without contact between the fixed parts and the movable parts in the linear magnetic driving mechanism 30. On the one hand, it can eliminate the frictional resistance between the fixed parts and the movable parts, which helps to improve the reaction speed and moving speed of the mobile group 21, and achieves fast focusing or zooming. In order to prevent the normal activities of the mobile group 21 from being affected, when the electromagnetic driving mechanism 22 gains power, the latch 201 can be driven to the unlocking position. When the electromagnetic driving mechanism 22 loses power, the reset member 23 is configured to switch the latch 201 from the unlocking position to the locking position. Since the linear electromagnetic driving mechanism 22 requires the electricity to generate the magnetic drive, if the linear electromagnetic driving mechanism 22 suddenly loses power, the latch 201 will be automatically switched to the locking position by the reset member 23, making the mobile group 21 unable to move. This is to solve the problem that in the lens structure with fast focusing, the locking structure 40 will fail to lock when the power is suddenly cut off, causing the risk of damage to the lens.

It should be noted that the reset member 23 can be a spring or a compressing spring 231, etc., and the power supply 50 can be adjusted. The electromagnetic driving mechanism 22 can drive the latch 201 from locking to unlocking through a high speed (lower than 24V). When the latch 201 is driven to the locked state, since the spring force is small, the holding voltage is small, the power consumption is small, and it is not easy to burn out, which can also be maintained by a small current.

Further, please refer to FIG. 4. In this embodiment, a guiding slope 11 is provided on a sidewall of each locking groove 1a close to the adjacent locking groove 1a. In an embodiment, an end portion of the latch 201 is tapered. In this way, when the latch 201 moves close to the locking groove 1a, the guiding slope 11 or the slope of the end of the latch 201 can guide, so that the latch 201 can be smoothly inserted into the locking groove 1a, which also facilitates that the latch 201 can be inserted at any desired position and guided into the locking groove 1a.

Specifically, please refer to FIG. 5. In this embodiment, the electromagnetic driving mechanism 22 includes a magnetic circuit assembly 221 and an inducting coil 222. The magnetic circuit assembly 221 is fixed on the mobile group 21, and the inducting coil 222 is fixedly connected to the latch 201. The magnetic circuit assembly 221 is formed with a magnetic field, and at least part of the inducting coil 222 is in the magnetic field. When the inducting coil 222 is energized and interacts with the magnetic circuit assembly 221, the inducting coil 222 is movable relative to the magnetic circuit assembly 221 along the groove depth direction of the locking groove 1a, so as to drive the latch 201 to move. In this way, when the power supply 50 supplies power to the inducting coil 222, the magnetic field generated by the inducting coil 222 interacts with the magnetic circuit assembly 221, thereby generating a driving force.

In an embodiment, the electromagnetic driving mechanism 22 includes two electromagnetic inducting coils 222, and the mutual magnetic force generated by which after being energized can be used to drive. The electromagnetic driving mechanism 22 is not limited to the above examples. Those skilled in the art may make other changes under the inspiration of the technical essence of the embodiments of this specification, but as long as the functions and effects achieved are the same or similar as those of the embodiments of this specification, they should be covered in the scope of the embodiments of this specification.

In this embodiment, please refer to FIG. 5 and FIG. 8. The inducting coil 222 is provided on a periphery of the latch 201 to have a first wire group 2221 and a second wire group 2222 respectively provided on both sides of the latch 201. The magnetic circuit assembly 221 includes a plurality of magnets 2211 extending along the groove depth direction of the locking groove 1a. The plurality of magnets 2211 include two first magnets 22111 provided at intervals and two second magnets 22112 provided at intervals. The two first magnets 22111 and the two second magnets 22112 are provided opposite each other, and are respectively provided on opposite sides of the latch 201. The magnetic poles of the two first magnets 22111 close to each other are provided differently. The first wire group 2221 is located in the first magnetic gap formed between the two first magnets 22111. The magnetic poles of the two second magnets 22112 close to each other are provided differently. The second wire group 2222 is located in the second magnetic gap formed between the two second magnets 22112. In this way, the first wire group 2221 is in the magnetic field formed by the two first magnets 22111, and the second wire group 2222 is in the magnetic field formed by the two second magnets 22112, so that both sides of the inducting coil 222 provided oppositely can interact with the two first magnets 22111 and the two second magnets 22112 at the same time to form a balanced driving force.

In this embodiment, please refer to FIG. 5 to FIG. 8. The locking member 1 is fixed on the inner wall of the lens barrel 10, and the locking mechanism 2 is fixed on the mobile group 21. The locking mechanism 2 also includes an installing shell 3 and an installing bracket 4, and the installing shell 3 is fixedly connected to the mobile group 21. A magnetic circuit assembly 221 is provided on the installing shell 3, and one end of the installing shell 3 towards the locking member 1 is provided with an opening 3a. The installing bracket 4 is sleeved in the installing shell 3, the latch 201 is installed on the installing bracket 4, and an inducting coil 222 is installed on the installing bracket 4. The installing bracket 4 can drive the latch 201 to move. In the locking position, at least part of the latch 201 is exposed outside the opening 3a to cooperate with the locking groove 1a to lock.

In this embodiment, the reset member 23 includes a compressing spring 231 located on the side of the latch 201 away from the locking member 1, and the compressing spring 231 is located between the latch 201 and the inner wall of the installation shell 3. In this way, through the elastic deformation ability of the compressing spring 231, the elastic potential energy can be stored when being compressed. When the external force is removed, the compressing spring 231 can release the elastic potential energy in time, so that the latch 201 can quickly and automatically switch to the locking position.

In this embodiment, the installing shell 3 is configured as a magnetically conductive installing shell 3, and the magnetic circuit assembly 221 is magnetically connected to the magnetically conductive installing shell 3. In this way, the magnetically conductive installing shell 3 is formed with a closed loop of the magnetic field. Since magnetically permeable materials can attract and concentrate magnetic field lines, they can concentrate the magnetic field in a specific area. Magnetic conductive materials can concentrate the magnetic field on the coil, thereby increasing the inductance. Moreover, the magnetic circuit assembly 221 does not need other fixing structures to be fixed in the installing shell 3.

In this embodiment, please refer to FIG. 7 to FIG. 8. The locking mechanism 2 also includes a limiting end cap 5 covered on the opening 3a. The limiting end cap 5 is configured to limit the latch 201 in the locking position when the latch 201 is reset and moving towards the locking position. In an embodiment, a limiting convex portion 301 is also formed in the installing shell 3, and the limiting convex portion 301 is provided one side of the installing bracket 4 facing away from the opening 3a. The limiting convex portion 301 is configured to limit the latch 201 to the unlocking position when the installing bracket 4 drives the latch 201 to move toward the unlocking position. In this way, through the limiting end cap 5 or the limiting convex portion 301, the latch 201 can be limited when moving along the groove depth direction of the locking groove 1a, and the structure is simple and compact.

Specifically, please refer to FIG. 9. In this embodiment, the linear magnetic driving mechanism 30 includes a linear motor, the linear motor includes a stator structure 31 and a mover structure 32, the stator structure 31 is connected to the lens barrel 10, and the stator structure 31 includes a linear guiding rail 311 extending in the front-to-rear direction. The mover structure 32 includes at least one mover 321, the mover 321 is slidably provided on the linear guiding rail 311 in the front-to-rear direction, and the mover 321 is fixedly connected to the mobile group 21. In this way, through the stator structure 31 and the mover structure 32 of the linear magnetic driving mechanism 30, the mover structure 32 can move relative to the stator structure 31, and through the linear guiding rail 311, the mover structure 32 can move along a straight line, so that the mobile group 21 is driven to move along a straight line.

Please refer to FIG. 2. In this embodiment, the zoom lens 100 also includes a power supply 50 and an electronic control apparatus 60. The power supply 50 is configured to supply power to the electromagnetic driving mechanism 22. The electronic control apparatus 60 and the power supply 50 are electrically connected to the electromagnetic driving mechanism 22 for controlling the current of the power supply 50. In this way, when the electromagnetic driving mechanism 22 drives the latch 201 from locking to unlocking, the power supply 50 can be controlled to supply power to the electromagnetic driving mechanism 22 with a larger current, that is, the electromagnetic driving mechanism 22 can operate at a high voltage (lower than 24V) to perform driving work. Of course, when the latch 201 is in the unlocked state, due to the small spring force, the required holding voltage is small and the power consumption is small. The electronic control apparatus 60 can also provide a small current to the electromagnetic driving mechanism 22, so that the latch 201 can remain in the unlocked state.

In this embodiment, the power supply 50 is also configured to supply power to the linear magnetic driving mechanism 30. The electronic control apparatus 60 is also electrically connected to the linear magnetic driving mechanism 30 and is configured to control the power supply 50 to provide a synchronous power supply and a synchronous disconnection to the linear magnetic driving mechanism 30 and the electromagnetic driving mechanism 22.

It should be noted that in the related art, when the automatic focusing is required, the electromagnetic force of the locking mechanism 2 will be released, so that the locking structure 40 of the zoom lens 100 can move freely. However, when the electromagnetic driving mechanism 22, for example the VCM, that drives the zoom group or the focus group is powered off, the zoom group or the focus group needs to be locked synchronously to ensure the accuracy. However, since there is a certain delay in the control system receiving and issuing instructions of the locking mechanism 2 in the related art, the locking time is not timely.

Through the locking structure 40, when it is necessary to drive the mobile group 21 through the electromagnetic driving mechanism 22 (for example the VCM), the power supply 50 supplies power to the electromagnetic driving mechanism 22 and the linear magnetic driving mechanism 30, so that the latch 201 can move to the unlocking position, thus not interfering with the electromagnetic driving mechanism 22 driving the mobile group 21. When the mobile group 21 does not need to move and needs to be positioned, the power supply 50 stops to supply power to the electromagnetic driving mechanism 22, and power is also stopped to the linear magnetic driving mechanism 30. At this time, the reset member 23 automatically switches the latch 201 from the unlocking position to the locking position. The power supply and power off of the electromagnetic driving mechanism 22 and the linear magnetic driving mechanism 30 is synchronously controlled by the power supply 50, the locking structure 40 can automatically synchronize with the moving state of the mobile group 21 according to the power supply situation of the power supply 50. At the same time, it can also solve the problem that there is a certain delay in the control system of the locking mechanism 2 of the locking structure 40 of the zoom lens 100 in the related art, and the locking time is not timely.

Since the mobile group 21 is driven by the linear magnetic driving mechanism 30, if the driving direction of the linear magnetic driving mechanism 30 deviates from the direction of the optical axis, the position of the mobile group 21 during moving will be deviated. For this reason, in this embodiment, the zoom lens 100 also includes a regulating mechanism 70 and a photosensitive element 83. The regulating mechanism 70 includes a fixed seat 6, a first adjusting member 71, a first slider 81, a second adjusting member 72 and a second slider 82. The fixed seat 6 is fixed in the lens barrel 10 and is provided with a first sliding groove 6a extending in the left-to-right direction. The first adjusting member 71 is adjustable in the left-to-right direction on the fixed seat 6. The first slider 81 is slidably cooperated with the first sliding groove 6a, the first slider 81 includes a first abutting portion for abutting against the first adjusting member 71 during moving, so that the position of the first slider 81 in the left-to-right direction can be adjusted. The second adjusting member 72 is adjustably provided on the first slider 81 in the up-to-down direction. The second slider 82 is provided with a second sliding groove 82a extending in the up-to-down direction, and the second slider 82 is slidably cooperated with the first slider 81 through the second sliding groove 82a. The second slider 82 includes a second abutting portion for abutting against the second adjusting member 72 during moving, so that the position of the second slider 82 in the up-to-down direction can be adjusted. The photosensitive element 83 is fixed on the second slider 82.

It should be noted that the first adjusting member 71 and the second adjusting member 72 can be a micrometer structure. Since the adjustment accuracy of the micrometer structure is high, when the photosensitive element 83 needs to be adjusted in the left-to-right direction, the first adjusting member 72 can be rotated, and the movement of the first adjusting member 71 can be adjusted in the left-to-right direction. It can be understood that a first spring is provided between the first slider 81 and the fixed seat 6, and the first spring is configured to reset the first slider 81, thereby facilitating the first slider 81 to drive the photosensitive chip to slide and adjust in the left-to-right direction. When the photosensitive element 83 needs to be adjusted in the up-to-down direction, the second adjusting member 72 can be rotated, and the movement of the second adjusting member 72 can be adjusted in the up-to-down direction. It can be understood that a second spring is provided between the second slider 82 and the first slider 81, and the second spring is configured to reset the second slider 82, thereby facilitating the second slider 82 to drive the photosensitive chip to slide and adjust in the up-to-down direction.

In this way, by arranging two micrometer structures, the position of the photosensitive chip is adjusted and the center of the photosensitive element 83 is on the optical axis, so that the focus of the zoom lens 100 can fall on the photosensitive element 83, thus clearly imaging.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. A zoom lens, comprising:
a lens barrel extending in a front-to-rear direction;
a lens group comprising at least one mobile group movably provided in the lens barrel along the front-to-rear direction;
a linear magnetic driving mechanism provided in the lens barrel and drivenly connected to the mobile group; and
a locking structure comprising a locking member provided on one of the lens barrel and the mobile group, and a locking mechanism provided on the other one of the lens barrel and the mobile group, wherein the locking member comprises a plurality of locking grooves provided at intervals in the front-to-rear direction, and the locking mechanism comprises:
a latch movably provided in a direction approaching and away from each locking groove, wherein the latch has a locking position inserted into the locking groove and an unlocking position separated from the locking groove during a moving stroke;
an electromagnetic driving mechanism configured to drive the latch to move and drive the latch to switch from the locking position to the unlocking position when powered; and a reset member configured to switch the latch from the unlocking position to the locking position.

2. The zoom lens of claim 1, wherein the electromagnetic driving mechanism comprises a magnetic circuit assembly fixed on the mobile group and an inducting coil fixedly connected to the latch; and the magnetic circuit assembly is formed with a magnetic field, and at least part of the inducting coil is in the magnetic field; in response to that the inducting coil is energized to interact with the magnetic circuit assembly, the inducting coil is configured to move relative to the magnetic circuit assembly along a groove depth direction of the locking groove, so that the latch is driven to move.

3. The zoom lens of claim 2, wherein the inducting coil is provided on a periphery of the latch to comprise a first wire group and a second wire group respectively provided on both sides of the latch; and the magnetic circuit assembly comprises a plurality of magnets extending along the groove depth direction of the locking groove, and the plurality of magnets comprise two first magnets provided at intervals and two second magnets provided at intervals; magnetic poles of the two first magnets close to each other are different, and the first wire group is provided in a first magnetic gap formed between the two first magnets; magnetic poles of the two second magnets close to each other are different, and the second wire group is provided in a second magnetic gap formed between the two second magnets.

4. The zoom lens of claim 2, wherein the locking member is fixed on an inner wall of the lens barrel, the locking mechanism is fixed on the mobile group, and the locking mechanism further comprises:

an installing shell fixedly connected to the mobile group, wherein the magnetic circuit assembly is provided on the installing shell, and an opening is provided at one end of the installing shell towards the locking member; and an installing bracket sleeved in the installing shell, wherein the latch is installed on the installing bracket, and the inducting coil is installed on the installing bracket; the latch can be driven to move by the installing bracket, and at least part of the latch is exposed outside the opening in the locking position.

5. The zoom lens of claim 4, wherein the reset member comprises a compressing spring provided on one side of the latch away from the locking member, and the compressing spring is provided between the latch and an inner wall of the installing shell.

6. The zoom lens of claim 4, wherein the installing shell is configured as a magnetically conductive installing shell magnetically connected to the magnetic circuit assembly.

7. The zoom lens of claim 4, wherein the locking mechanism further comprises a limiting end cap covering the opening, and the limiting end cap is configured to limit the latch in the locking position in response to that the latch is reset and moving towards the locking position.

8. The zoom lens of claim 4, wherein a limiting convex portion is formed in the installing shell and provided on one side of the installing bracket away from the opening, and the limiting convex portion is configured to limit the latch in the unlocking position in response to that the latch is driven by the installing bracket to move towards the unlocking position.

9. The zoom lens of claim 1, wherein the linear magnetic driving mechanism comprises a linear motor, and the linear motor comprises:

a stator structure connected to the lens barrel and comprising a linear guiding rail extending in the front-to-rear direction; and a mover structure comprising at least one mover slidably provided on the linear guiding rail along the front-to-rear direction, wherein the mover is fixedly connected to the mobile group.

10. The zoom lens of claim 1, further comprising:

a power supply configured to supply power to the electromagnetic driving mechanism; and an electronic control apparatus electrically connected to the power supply and the electromagnetic driving mechanism and configured to control a current of the power supply.

11. The zoom lens of claim 10, wherein the power supply is further configured to supply power to the linear magnetic driving mechanism; and the electronic control apparatus is electrically connected to the linear magnetic driving mechanism, and is configured to control the power supply to synchronously supply power and disconnect power to the linear magnetic driving mechanism and the electromagnetic driving mechanism.

12. The zoom lens of claim 1, further comprising:

a regulating mechanism; and a photosensitive element;

wherein the regulating mechanism comprises:

a fixed seat fixed in the lens barrel and provided with a first sliding groove extending in a left-to-right direction;

a first adjusting member adjustably provided on the fixed seat in the left-to-right direction;

a first slider slidably cooperated with the first sliding groove and comprising a first abutting portion for abutting against the first adjusting member during moving, so that a position of the first slider in the left-to-right direction is adjusted;

a second adjusting member adjustably provided on the first slider in an up-to-down direction; and a second slider provided with a second sliding groove extending in the up-to-down direction, wherein the second slider is slidably cooperated with the first slider through the second sliding groove, and the second slider comprises a second abutting portion for abutting against the second adjusting member during the moving stroke, so that a position of the second slider in the up-to-down direction is adjusted; the photosensitive element is fixed on the second slider.

* * * * *